United States Patent

Amesbichler et al.

[11] Patent Number: 6,035,510
[45] Date of Patent: Mar. 14, 2000

[54] METHOD FOR ASSEMBLY OF A SLIDING SUNROOF ASSEMBLY

[75] Inventors: Georg Amesbichler, Munich; Hansjoerg Kauschke, Deisenhofen, both of Germany

[73] Assignee: Webasto Sunroofs, Inc., Rochester Hills, Mich.

[21] Appl. No.: 09/084,402

[22] Filed: May 27, 1998

Related U.S. Application Data

[62] Division of application No. 08/663,024, Jun. 7, 1996.

[30] Foreign Application Priority Data

Jun. 9, 1995 [DE] Germany ................... 4658159

[51] Int. Cl.⁷ ................................... B23P 11/00
[52] U.S. Cl. ............................. 29/434; 29/468
[58] Field of Search ............... 29/434, 464, 466, 29/468, 407.01, 407.1

[56] References Cited

U.S. PATENT DOCUMENTS

| | | |
|---|---|---|
| 3,620,524 | 11/1971 | Czompi . |
| 4,553,309 | 11/1985 | Hess et al. . |
| 4,589,184 | 5/1986 | Asano et al. . |
| 4,589,199 | 5/1986 | Ohtaki et al. . |
| 4,601,091 | 7/1986 | Grimm et al. . |
| 4,604,797 | 8/1986 | Kitamura et al. . |
| 5,165,164 | 11/1992 | Kubo et al. . |
| 5,397,047 | 3/1995 | Zampini .................. 29/464 |
| 5,400,943 | 3/1995 | Rossi ....................... 29/466 |
| 5,640,750 | 6/1997 | Yoshida et al. ........... 29/464 |

FOREIGN PATENT DOCUMENTS

| | | |
|---|---|---|
| 0072277 | 2/1983 | France . |
| 2271651 | 4/1994 | Japan . |

*Primary Examiner*—Irene Cuda
*Assistant Examiner*—Trinh T. Nguyen
*Attorney, Agent, or Firm*—Pillsbury Madison & Sutro LLP

[57] ABSTRACT

The invention relates to a device and a method for the assembly of a sliding sunroof frame and for the adjustment of a cover connected with it in a vehicle. The device has a tool that has one portion that can be introduced into the body of a vehicle and another portion that can be positioned above a roof opening of the vehicle. A positioning assembly for the sliding sunroof frame and the cover and various adjusting component with centering devices are provided on a floating frame on part of the tool positioned in the vehicle body, and allow fully automated raising and alignment, as well as fastening of the sliding sunroof frame to the vehicle roof and complete adjustment without play and fastening of the sliding sunroof cover to its tilting mechanism.

3 Claims, 9 Drawing Sheets

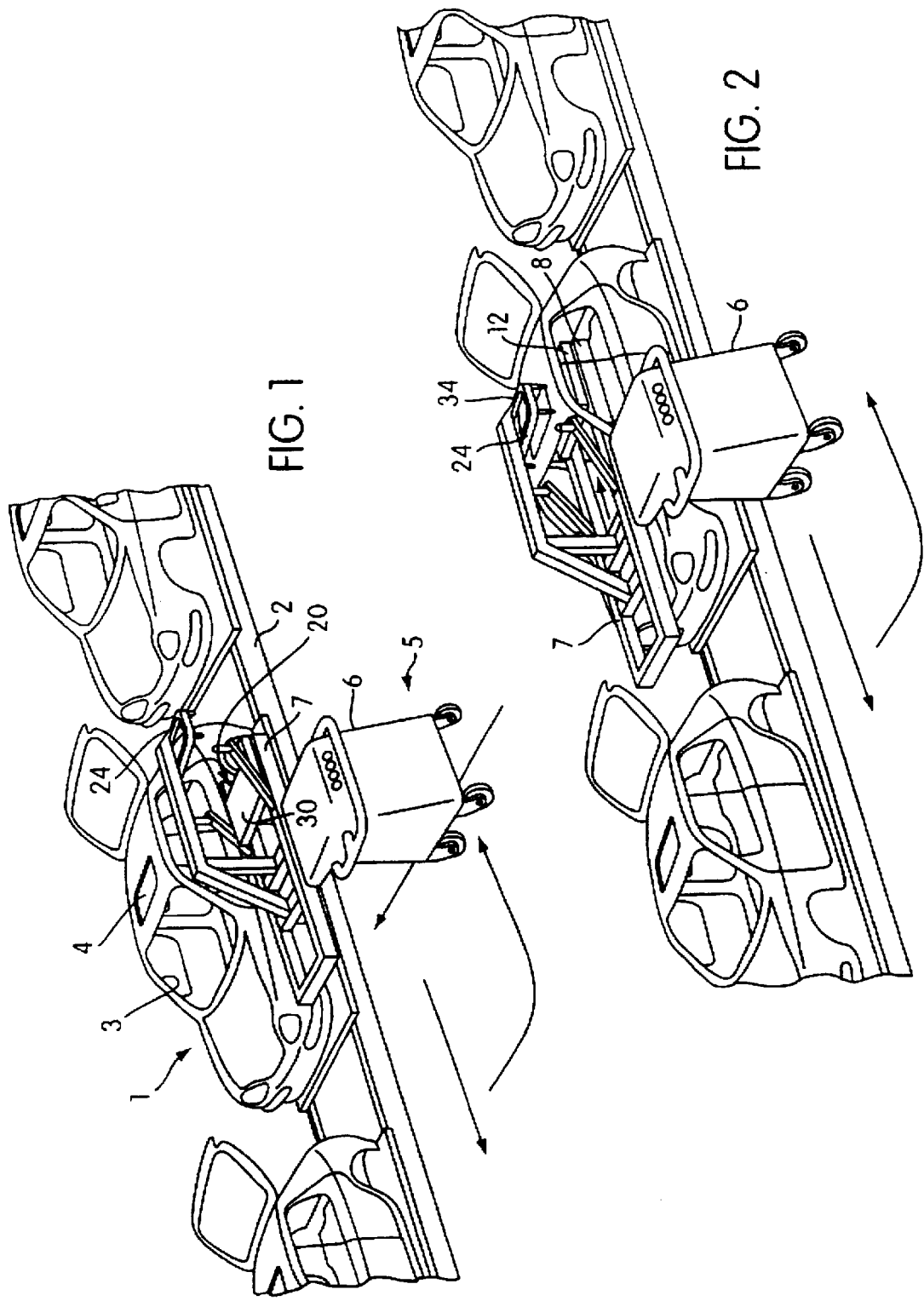

METHOD FOR ASSEMBLY OF A SLIDING SUNROOF ASSEMBLY

This is a division of application Ser. No. 08/663,024, filed Jun. 7, 1996.

FIELD OF THE INVENTION

The invention relates to a device and a method for the assembly of a sliding sunroof frame for a motor vehicle, as well as for adjustment of a cover that is connected with it.

BACKGROUND OF THE INVENTION

A method and a device for the height adjustment and assembly of the cover of a sliding sunroof have been disclosed in DE-C2 34 35 813. This document discloses an arrangement wherein the sunroof cover is pulled upward into a position that is flush with the surrounding solid roof skin by means of an assembly template placed on the roof of the vehicle from above and bonding elements that are disposed on it, while fixed spring elements that are supplied with the cover or its associated mechanism push the cover and its front edge against a seal. The sliding sunroof frame must first be manually mounted over the worker's head on a reinforcement frame that is provided beneath the roof opening. The cover is also manually screwed to its operating mechanism over the worker's head from the passenger compartment of the vehicle. The relatively expensive spring elements remain in the vehicle roof after adjustment of the cover, thereby increasing its price and weight.

SUMMARY OF THE INVENTION

The object of the present invention is to provide a device and a method for the assembly of a sliding sunroof frame and the adjustment of a cover that significantly simplifies and accelerates assembly.

The object of the present invention is realized by providing a device for the mounting of a sliding sunroof frame and cover therefor on a motor vehicle roof having an underside sunroof reinforcement frame which comprises a stand that is movable relative to a motor vehicle body, and a tool mounted on the stand and constructed and arranged to have a portion thereof introduced into the motor vehicle body. A floating frame is mounted for movement on the tool, and actuators disposed on the tool are constructed and arranged to move the floating frame relative to the tool. Sensors are provided to monitor positioning of the floating frame in relation to a motor vehicle roof opening. A vertically movable lifting frame is disposed on the floating frame and constructed and arranged to be adjustably moved into different vertical positions. A positioning assembly is disposed on the floating frame constructed and arranged to mount the sliding sunroof frame. The positioning arrangement includes a centering assembly constructed and arranged to align the sliding sunroof frame with the reinforcement frame provided on the motor vehicle roof. The positioning arrangement further includes a fastening mechanism constructed and arranged to fasten the sliding sunroof frame to the reinforcement frame. In addition, vertically movable end stops having suction devices are mounted on the tool and constructed and arranged to engage and move the cover on a slide-and-tilt mechanism to enable said cover to be connected with said sliding sunroof frame before it is fixed to said slide-and-tilt mechanism.

The object of the present invention is also accomplished by providing a method for assembling a sliding sunroof frame and cover therefor on a motor vehicle roof having an underside sunroof reinforcement frame. The method comprises the steps of a) positioning the sliding sunroof and cover on a positioning assembly provided on a lifting frame; b) introducing a lower part of a tool into an opening of a motor vehicle body and positioning an upper part of the tool above a roof opening provided in the roof of the motor vehicle body; c) positioning a floating frame supported by the lifting frame at the roof opening by use of actuators disposed on the tool, and monitoring the position of the floating frame by use of sensors; d) raising the lifting frame and pressing the sliding sunroof frame against the reinforcement frame disposed on the underside of the vehicle roof; e) fastening the sliding sunroof frame to the reinforcement frame; f) engaging and securing the cover with suction devices, and then moving the suction devices upwards to move the cover upwards; g) moving the suction devices generally in a first direction so that the cover is pressed against a seal adjacent a front edge of the roof opening; h) moving a sliding sunroof mechanism connected with the cover in a direction opposite the first direction; i) fastening the cover to the sliding sunroof mechanism; j) raising the upper part of the tool after evacuating air from the suction devices, lowering the lifting frame, and removing the device from the motor vehicle body.

The present invention advantageously enables the frame of a slide-and-tilt sunroof to be installed completely automatically, including the height adjustment of the cover. Due to the load on the cover toward the front and on the slide-and-tilt sunroof toward the rear, subsequent manual adjustment of the cover is completely unnecessary, because all play has been squeezed out of the components concerned. The installation and adjustment time for a slide-and-tilt sunroof on the assembly line is thereby reduced from the previous level of over ten minutes to less than two minutes. Eliminating the strenuous over-the-head work helps facilitate installation.

As another advantage, the device of the present invention provides a floating frame that can slide in relation to a base frame in the X direction by means of an actuator and in the Y direction by means of a second actuator. The actuators are preferably constructed as pneumatic cylinders. When that is done, the sliding frame can best be fixed in relation to the base frame by means of clamping devices. In a particularly advantageous embodiment, those clamping devices are functionally connected with the actuators and block their sliding movement in phases. During the fine adjustment of the sliding sunroof frame in relation to a reinforcement frame that is arranged on the solid vehicle roof, as well as during the adjustment of the cover, the clamping devices release the floating mount of the floating frame in relation to the base frame, whereas it holds it during the other working steps.

In accordance with another advantageous development, the device includes a tool, the upper part of which is disposed on the floating frame. Therefore, the upper part of the tool benefits with regard to its fine positioning in relation to the cover and the roof opening from the fine positioning of the roof frame and thereby of the floating frame in relation to the reinforcement frame that is fixed to the roof.

The device of the present invention also provides suction devices on the upper part of the tool that are advantageously mounted so that they can slide in the X direction, i.e., in the travel direction of the completed vehicle, by means of a pressure cylinder. That allows the cover to be slid against the cover seal in the region of the front edge of the cover from the upper side of the cover. In accordance with another embodiment, the suction devices and end stops for the cover are disposed on a common bridge. The suction devices and the end stops are advantageously fastened to oscillate on the bridge, whereby each suction device and each end stop automatically adjusts to partial variations in the roof curvature of the body shell. In addition, suction devices and end stops are advantageously spring mounted on the bridge. The spring mounting ensures that the end stops are pressed against the solid roof skin with a defined pressure, and that they do not deform in a way that would hinder adjustment of the cover. Distortion of the solid roof skin in relation to the upper part of the tool is thereby effectively prevented.

The play in the operating mechanism of the cover is effectively eliminated by providing a compression cylinder that acts on a slide-and-tilt mechanism opposite the pressure cylinder and therefore opposite the X direction. That compression cylinder may optionally also exercise a downward force component on the mechanism in order to simulate the weight of the cover and the sealing force of the cover during the adjustment process in the case of a so-called "dipping" mechanism.

The operational steps of the method also allows automatic, free-from-play assembly of a sliding sunroof and accurate adjustment of a cover for that sunroof.

These and other objects of the present invention will become more apparent during the course of the following detailed description and appended claims. The invention may be best understood with reference to the accompanying drawings, wherein an illustrative embodiment is shown.

BRIEF DESCRIPTION OF THE DRAWINGS

FIG. 1 is a schematic representation of a device in accordance with the present invention in loading position.

FIG. 2 shows the device of the present invention approaching the assembly position.

Figure 3:
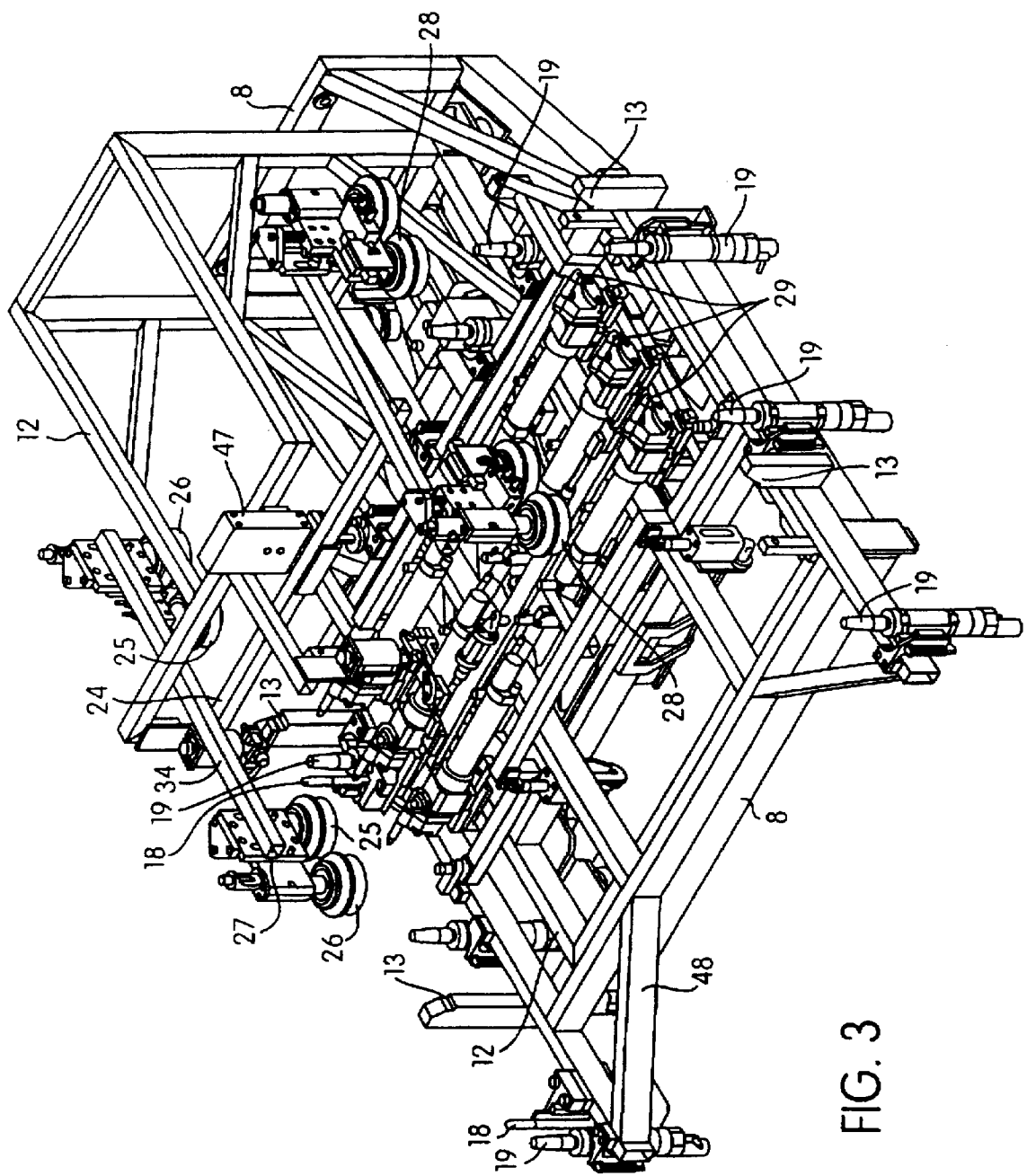
FIG. 3 is a general perspective view of the device of the present invention without the movable stand.
Figure 4:
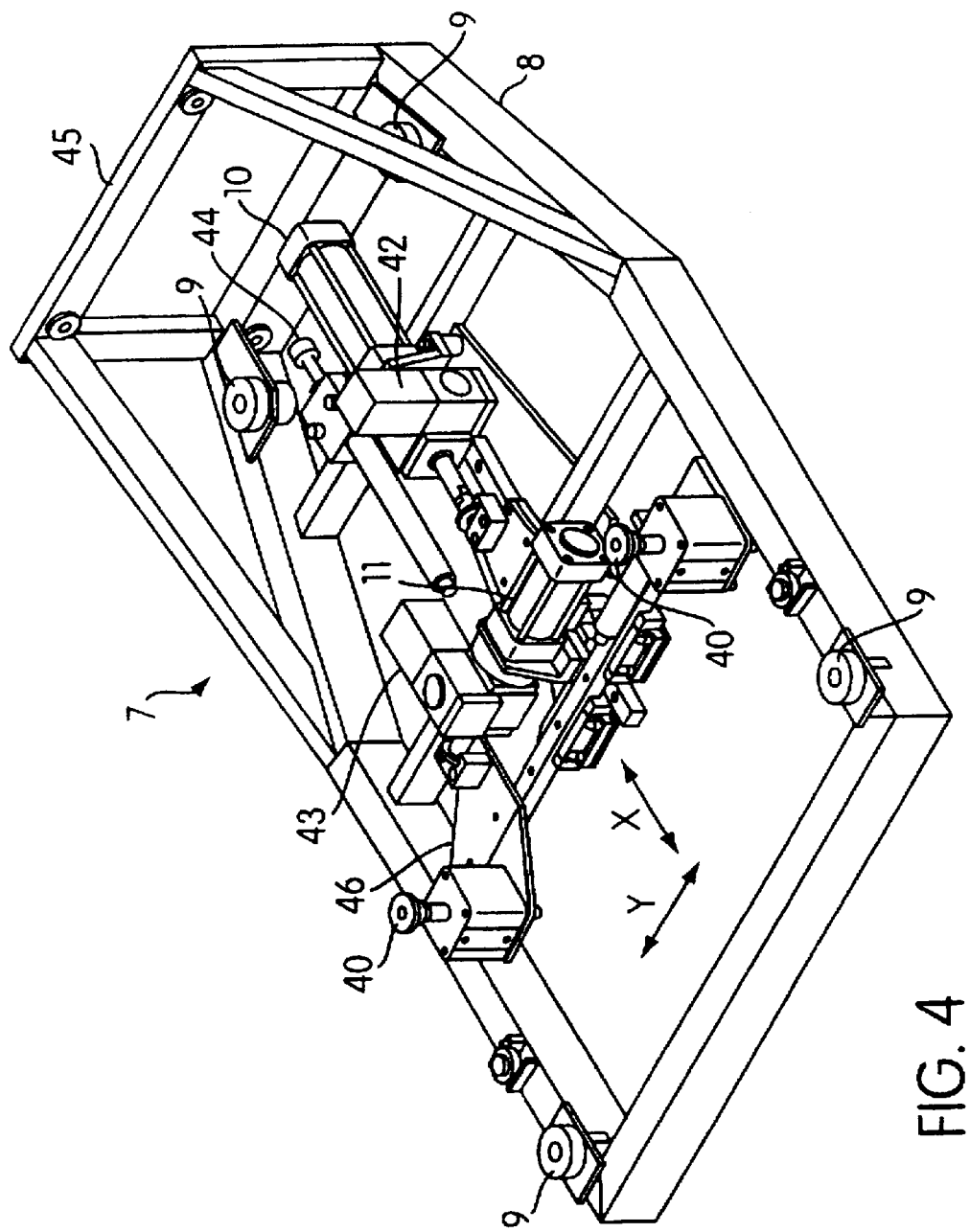
FIG. 4 is a perspective view of the base frame of the device of the present invention with the aggregates attached to it.
Figure 5:
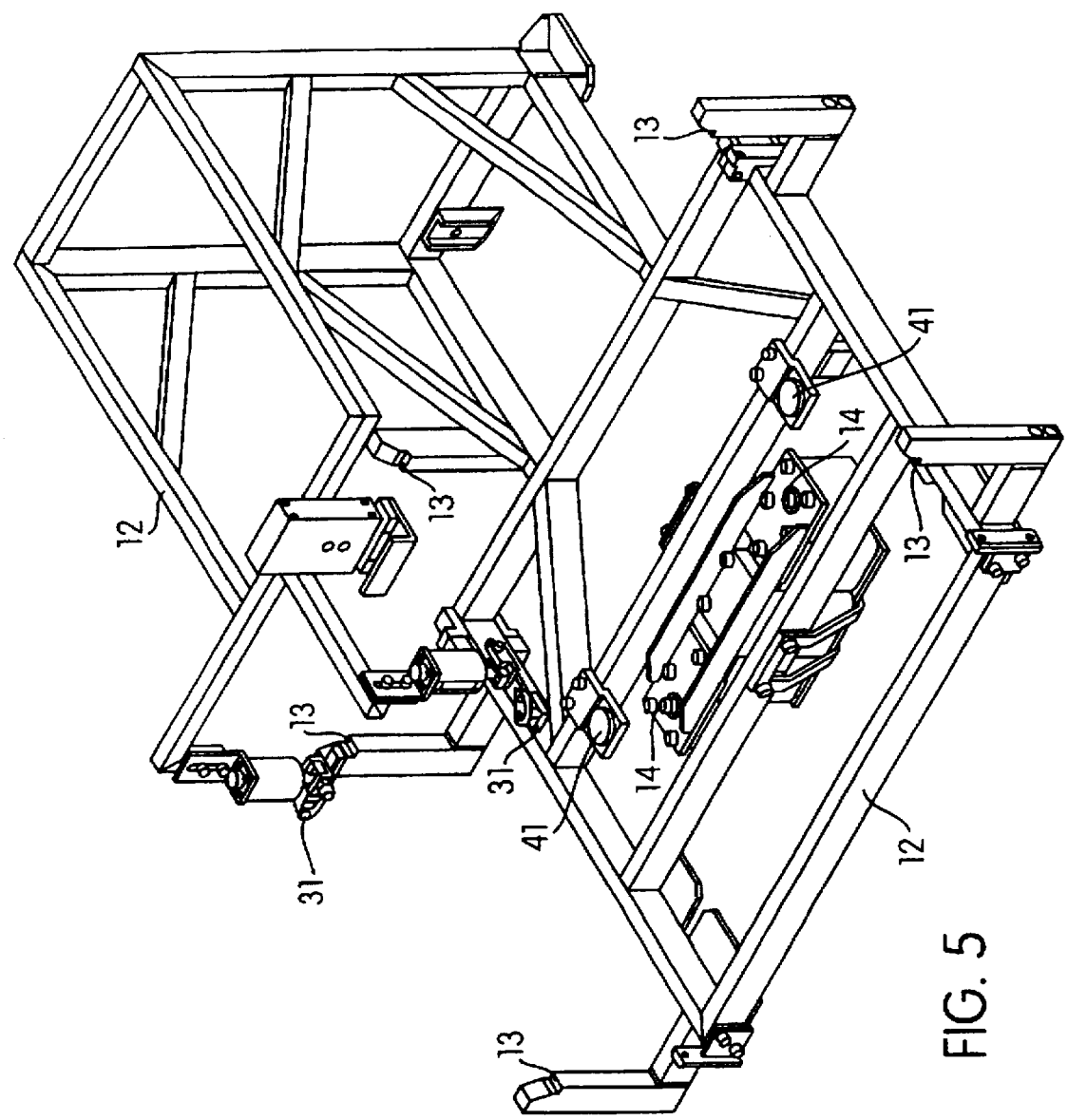
FIG. 5 is a perspective view of the floating frame with the upper part of the tool in accordance with the present invention.

| List of Reference Numerals | |
|---|---|
| 1 | Motor vehicle body |
| 2 | Assembly line |
| 3 | Windshield opening |
| 4 | Roof opening |
| 5 | Device |
| 6 | Stand |
| 7 | Bottom part of the tool |
| 8 | Base frame |
| 9 | Floating mount |
| 10 | Actuator (X direction) |
| 11 | Actuator (Y direction) |
| 12 | Floating frame 13 |
| | Positioning means (for SD frame) |
| 14 | Lifting device |
| 15 | Reinforcement frame |
| 16 | Centering hole (in 15) |
| 17 | Fastening holes (in 15) |
| 18 | Centering pin |
| 19 | Screw driver |
| 20 | Sliding sunroof frame |
| 21 | Centering hole (in 20) |
| 22 | Fastening hole (in 20) |
| 23 | Vehicle roof |
| 24 | Upper part of the tool |
| 25 | Suction devices |
| 26 | End stops |
| 27 | Cross-piece |
| 28 | Pressure cylinder |
| 29 | Cover screw driver |
| 30 | Cover |
| 31 | Sensor |
| 32 | Fastening screw (for 20) |
| 33 | Fastening screws (for 30) |
| 34 | Cross-beam |
| 35 | Fastening straps (on 30) |
| 36 | Cover seal |
| 37 | Spring |
| 38 | Tilt-and-lift mechanism |
| 39 | Compression cylinder |
| 40 | Centering press |
| 41 | Centering bushing |
| 42 | Clamping device (for 10) |
| 43 | Clamping device (for 11) |
| 44 | Speed regulator |
| 46 | Supporting plate |
| 47 | Lowering device |
| 48 | Lifting frame |

DETAILED DESCRIPTION

FIG. 1 shows a schematic view of a motor vehicle body 1 that is conveyed at a specific rate with other motor vehicle bodies on an assembly line 2. The motor vehicle body 1 has a windshield opening 3 and a roof opening 4. A device that is referenced in its entirety as 5 is shown in a loading position in front of the assembly line 2. The device 5 is comprised of a movable stand 6 and a bottom part of the tool 7, as well as an upper part of the tool 24 that is connected to it.

In the loading position shown in FIG. 1, the device 5 is charged with screws to fasten a sliding sunroof frame 20, which is subsequently positioned on corresponding seats on the bottom part of the tool 7. The screws may be charged and the sliding sunroof frame may be positioned manually, semi-automatically, or fully automatically by a robot. In the selected execution example, the cover 30 of the slide-and-tilt sunroof is preassembled to the sliding sunroof frame. However, as an alternative, it is possible to add the cover and separately charge the cover screw drivers described below with the necessary fastening screws.

In FIG. 2, the stand 6 of device 5 has been moved to the assembly line 2 and, either by its own lateral movement or by the relative movement of the assembly line 2, has introduced the bottom part of the tool 7 with the base frame 8 and a floating frame 12 that is mounted to float on it, as well as sliding sunroof frame 20 that is disposed on the floating frame 12, through the windshield opening 3 into the interior of the motor vehicle body 1. At the same time, the upper part of the tool 24 is positioned roughly above the roof opening 4. In that assembly position, the stand 6 or the base frame 8 is fixed to the motor vehicle body 1 in such a fashion that no relative movements between the motor vehicle body 1 and the stand 6 can occur during the subsequent assembly.

Figure 11:
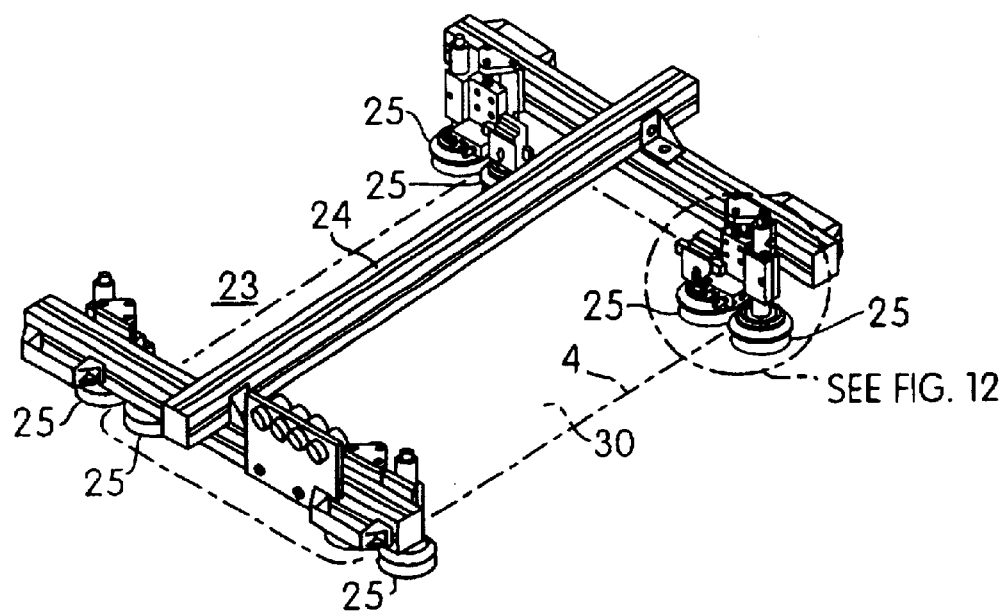
FIG. 11 is a perspective view of the suction devices and end stops disposed on a bridge in accordance with the present invention.
Figure 12:
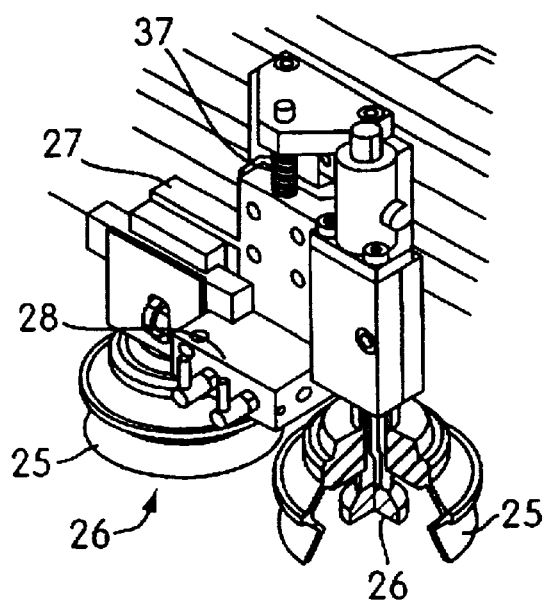
FIG. 12 is an enlarged partial view of a suction device and an end stop in accordance with the present invention.
Figure 13:
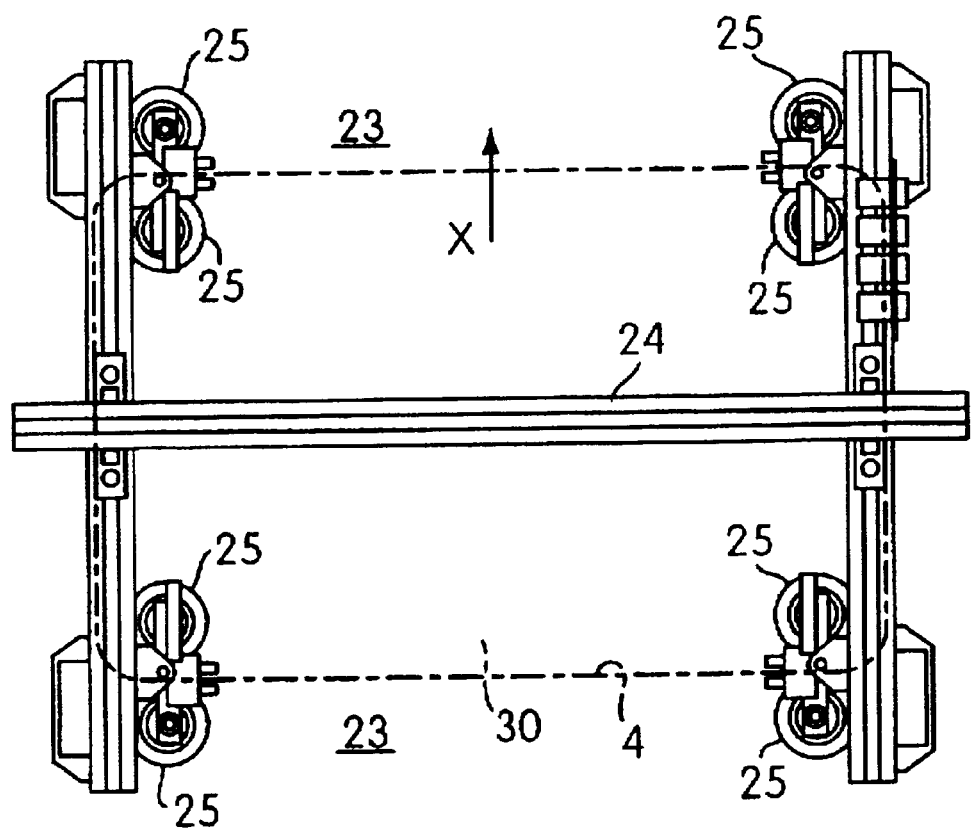
FIG. 13 is a top view of the upper part of the tool during the adjustment process as in FIG. 10 in accordance with the present invention.
Figure 14:
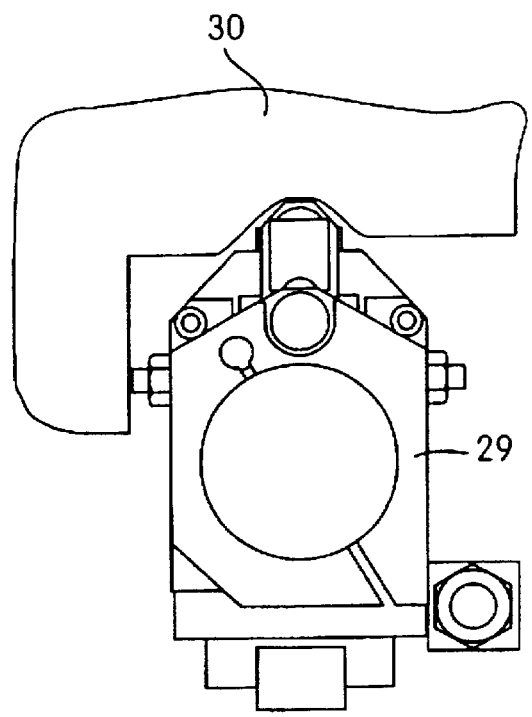
FIG. 14 is a front view of a cover screw driver optimized for the construction space in accordance with the present invention.
Figure 15:
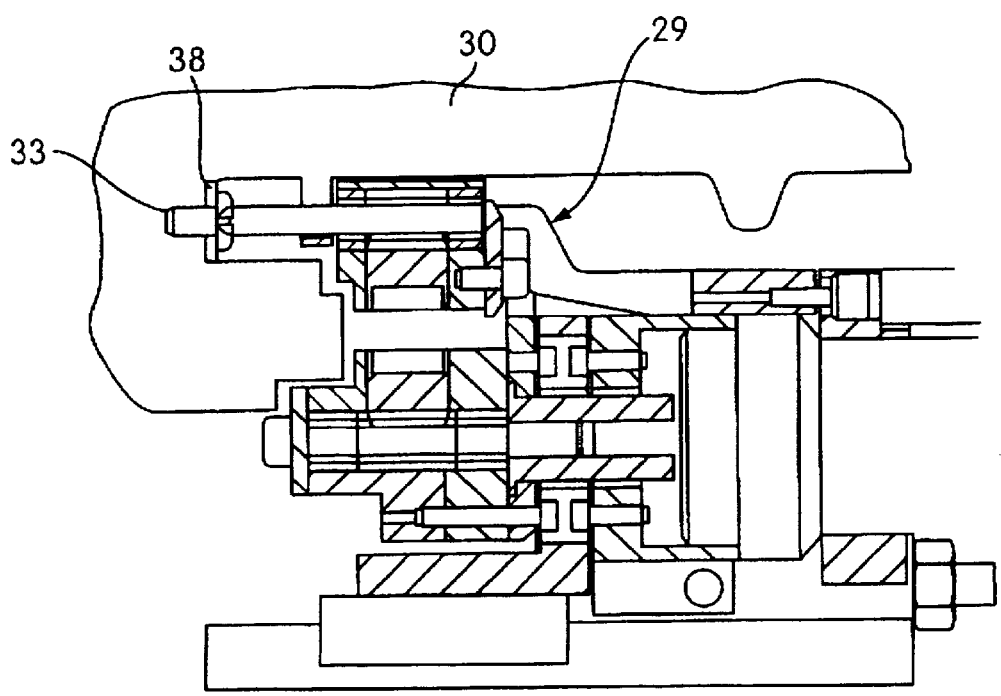
FIG. 15 a longitudinal view through the screw driver as in FIG. 14 while tightening the screws of the cover and the slide-and-tilt mechanism in accordance with the present invention.

The illustration of device 5 in FIGS. 1 and 2 is entirely schematic, in order to show the loading position and the assembly position. Exact details of the structure of the device are not provided until FIGS. 3 through 15, which are described below. The movable stand 6 is connected to the base frame 8 of the bottom part of the tool 7. At the corners of the base frame 8 are disposed four floating mounts 9 that allow slight movement by means of movably-mounted ball bearings of the floating frame 12 mounted on them. The floating frame 12 is fastened with corresponding centering bushings 41 through vertically-movable centering presses 40 that are disposed on the base frame 8. The shaft of the centering press 40 penetrates the centering bushings 41 and has sufficient play to allow limited movement of the floating frame 12 in relation to the base frame 8. If a cone-shaped projection on the head of the centering press 40 is moved downward, the press rests against the wall of the centering bushing 41 in such a way as to create a seal, thereby preventing movement of the floating frame 12 against the base frame 8. The centering presses 40 are disposed on a supporting plate 46. The supporting plate 46 is disposed so that it can move on the base frame 8 in the X direction, i.e., in the travel or longitudinal direction of the vehicle, by means of an actuator 10 in the form of a pneumatic cylinder. Supporting plate 46 can also slide on the base frame 8 in the Y direction, i.e., at right angles to the travel direction of the vehicle, by means of a second actuator 11, also in the form of a pneumatic cylinder. An oil-damped speed regulator 44 ensures that the actuator 10 causes the support plate 46 to slide without jerking. The movement of actuator 10 can be blocked or released by means of a clamping device 42 and the movement of actuator 11 can be blocked or released by means of a clamping device 43. The floating frame 12 has positioning means 13 for positioning the sliding sunroof frame. In addition, two sensors 31 equipped with switches are disposed on floating frame 12 and contact the inner edge of the roof opening 4 at two places when the device is being roughly positioned in relation to the roof opening 4, thereby indicating that the rough positioning has concluded. The upper part of the tool 24 is also disposed on the floating frame 12. The upper part of the tool 24 is disposed in such a way that it can be lowered and raised by means of a lowering device 47. As shown in FIGS. 11 through 13, the upper part of the tool 94 has on each of its sides one cross-beam 34, each of which has on its ends a pair of suction devices 25 with integrated end stops 26 that are disposed on a common cross-piece 27 so they can slide in relation to each other. The suction devices 25 provide secure positioning of the end stops 26 on the roof skin and the sliding sunroof cover 30 in the region of its corners and pull the latter upward during an adjustment process. The end stops 26 of a pair of suction devices 25 are solidly connected in the Z direction through the cross-piece 27 and reflect the exact distance between the heights of the cover 30 and the roof skin in each corner region. The suction devices 25 and end stops 26 are movable on the cross-piece 27 in the X direction with restricted force or path by means of one pressure cylinder 28 each. The cross-pieces 27 are spring mounted at right angles to the cross-beams 34 by means of one spring 37 each. When the bridge 34 is lowered by means of the lowering device 47, the spring 37 restricts the pressure force of the end stops 26, which prevents distortion of the solid roof skin in relation to the bridge 34. In addition, the end stops 26 are mounted to oscillate on the cross-piece 27, so that they can adjust to the individual curvature of the cover 30 or the vehicle roof 23.

A lifting frame 48 that is connected to the floating frame 12 holds two centering pins 18 that point upward and have head parts that taper toward the top, as well as multiple vertically arranged screw drivers 19 adjacent to the centering pins 18. These screw drivers are used to fasten the sliding sunroof frame 20 in relation to a reinforcement frame 15. In addition, three horizontally oriented cover screw drivers are provided on each side of the lifting frame 48. These screw drivers are used to screw the cover 30 to a sliding sunroof mechanism 38 that is disposed on the sliding sunroof frame 20 so that it can slide. The lifting frame 48 can also be raised in relation to the floating frame 12 by means of lifting devices 14, whereby the sliding sunroof frame 20 is pressed against a reinforcement frame 15.

Figure 6:
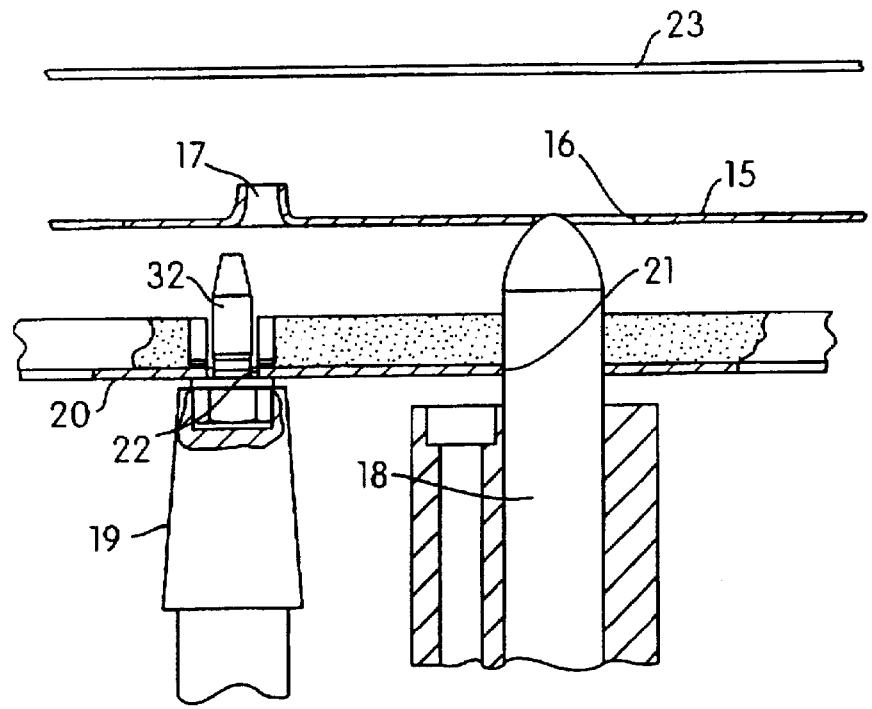
FIG. 6 is a partial view through the sliding sunroof frame and the reinforcement frame with the centering and fastening tool before centering in accordance with the present invention.
Figure 7:
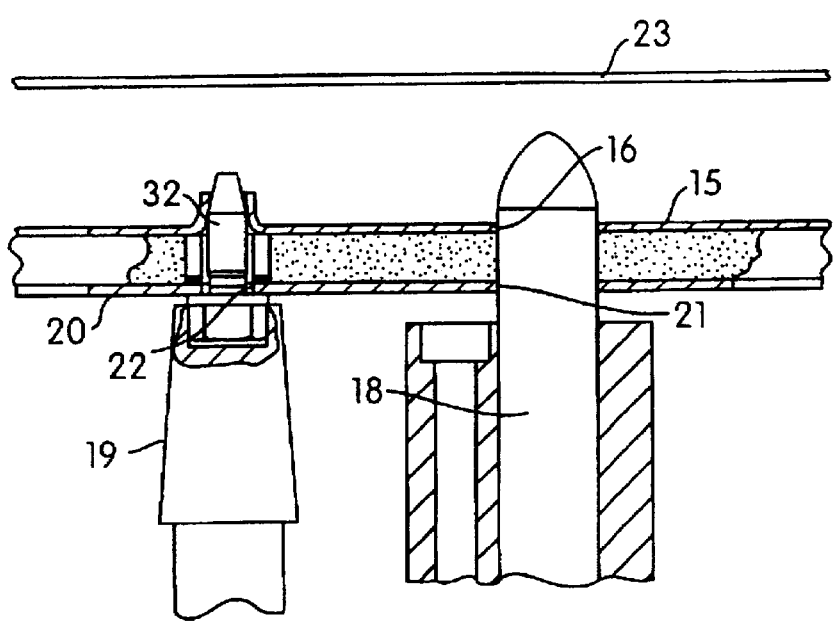
FIG. 7 is a view as in FIG. 6 after centering and fastening.
Figure 8:
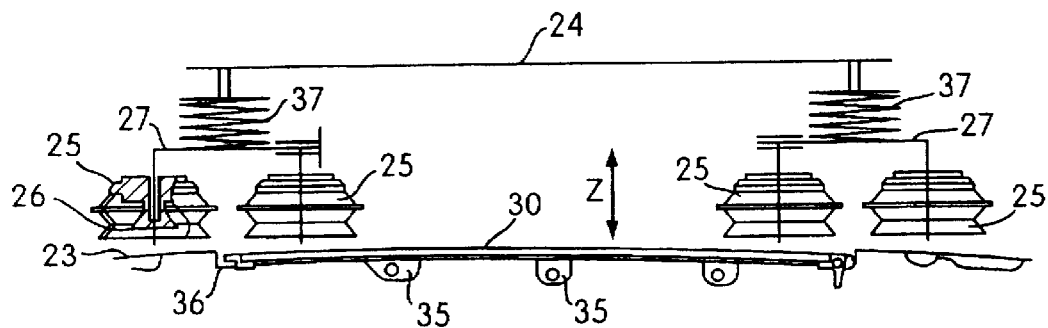
FIG. 8 is a schematic longitudinal section through the upper part of the tool before lowering the suction devices and end stops in accordance with the present invention.
Figure 9:
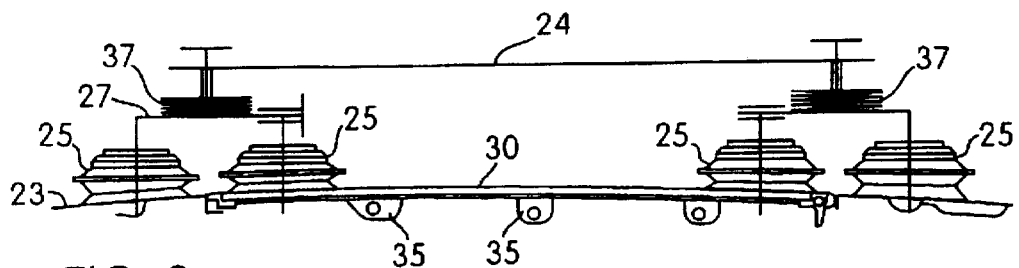
FIG. 9 is a view as in FIG. 8 after lowering the end stops and suction devices in accordance with the present invention.
Figure 10:
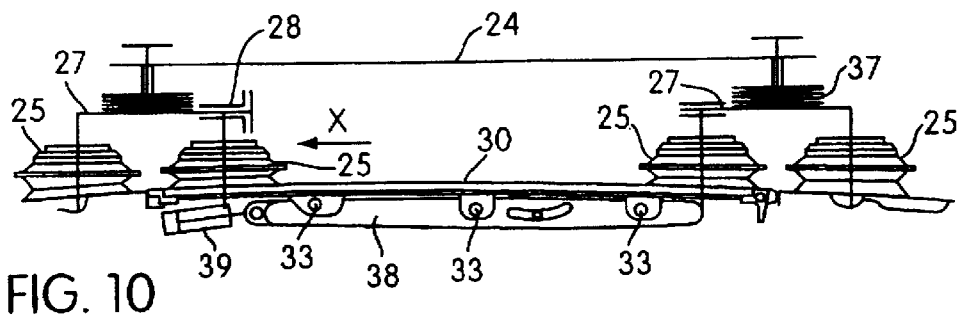
FIG. 10 is a view as in FIG. 9 with the pressure cylinder and compression cylinder having been activated.

The reinforcement frame 15 that is fixed to the solid vehicle roof 23 has centering holes 16 and multiple fastening holes 17. In the same way, centering holes 21 that have the same diameter as the centering holes 16 on the reinforcement frame 15 are provided on the sliding sunroof frame 20. The sliding sunroof frame 20 also has fastening holes 22 whose diameter is adapted to the diameters of the fastening holes 17 in the reinforcement frame 15. By rough positioning by means of the actuators 10 or 11, the floating frame 12, monitored by the sensors 31, is aligned in relation to the roof opening 4 in such a fashion that the centering pins 18 come to lie approximately underneath the centering holes 16 (FIG. 6). Subsequently, the actuators 10 and 11 that are responsible for the rough positioning are clamped by means of clamping devices 42 or 43. During the subsequent raising of the sliding sunroof frame 20 by means of the lifting device 14. The centering pins 18 provide accurate alignment of the sliding sunroof frame 20 in relation to the reinforcement frame 17 by slipping into the centering holes 16. To enable a floating mount of the floating frame 12 in relation to the base frame 8, the centering presses 40 are extended. When the sliding sunroof frame 20 is centered in relation to the reinforcement frame 15, that simultaneously causes the upper part of the tool 24 to assume from above the correct position in relation to the roof opening 4. After the centering pins 18 have covered the centering holes 16 or 21, the screw drivers 19 are activated, and they screw the fastening screws 39 into the fastening holes 17 of the reinforcement frame 15, thereby permanently fixing the sliding sunroof frame 20 in relation to the reinforcement frame 15.

After the sliding sunroof frame 20 is fastened on the reinforcement frame 15, the upper part of the tool 24 is lowered from above by means of the lowering device 47 against the cover 30 and against the solid roof skin of the vehicle roof 23 surrounding the cover. When that is done, the suction devices 25 with the end stops 26 near the corners contact the cover 30 and the region of the vehicle roof 23 that surrounds the roof opening 4. The end stops 26 guarantee an accurate distance in the Z direction, i.e., in the vertical or height direction of the motor vehicle body 1, between the cross-pieces 27 and the solid roof skin of the vehicle roof 23. When the suction devices 25 are operated, the cover 30 is raised in accordance with FIG. 9 into a position whose height is accurately aligned with the solid vehicle roof 23. The cover 30 is then pressed forward in the X direction by means of pressure cylinders against the seal 36 that is located there. At the same time, a pressure cylinder 39, which is disposed on the lifting frame 48, loads the slide-and-tilt mechanism 38, which must be connected with the fastening straps disposed on the cover 30, in the direction opposite the X direction, i.e., toward the rear. This completely eliminates the play in the slide-and-tilt mechanism 38 as well as in the drive cables linked to it, before the fastening screws 33, by means of cover screw drivers 29, provide permanent fixation of the slide-and-tilt mechanism 38 in relation to the cover 30.

When the cover 30 is supplied in preassembled condition, the fastening screws 33 are connected with the sliding sunroof mechanism 38. In that case, the cover screw drivers 29 are activated before activation of the pressure cylinder 28 or the compression cylinder 39 to loosen the fastening screws 33. After alignment and adjustment of the cover in relation to the sliding sunroof mechanism 38 as described above, the cover is permanently fixed in relation to the sliding sunroof mechanism 38 by re-tightening the fastening screws 33 by means of the cover screw drivers 29.

In contrast, if the cover 30 is separately inserted in seats that are provided for that purpose on the bottom part of the tool 7 or on the upper part of the tool 24, the cover screw drivers 29 are simultaneously supplied when the screw drivers 19 are charged with fastening screws 33. In that case, the fastening screws 33 are brought into contact with the cover 30 for the first time after it has been aligned and adjusted as described above.

After the sliding sunroof frame 20 has been fastened to the reinforcement frame 15 and after the cover 30 has been aligned and fastened in relation to the sliding sunroof mechanism 38, the suction devices 25 are deactivated, the upper part of the tool 24 is raised by operating the lowering devices 47 in the opposite direction, the lifting frame 48 is lowered using the lifting devices 14, and the complete device 5 is then removed from the motor vehicle body 1 by means of the stand 6 or by a corresponding movement of the assembly line 2. It is apparent that the device described above may be disposed not just on a movable stand 6, but also on a handling robot that correspondingly functions as a stand.

In any case, the device and method in accordance with the invention can significantly reduce assembly times.

It thus will be seen that the objects of this invention have been fully and effectively accomplished. It will be realized, however, that the foregoing preferred specific embodiment has been shown and described for the purpose of illustrating the principles of this invention, and is subject to change without departure from such principles. Therefore, this invention includes all modifications encompassed within the spirit and scope of the following claims.

What is claimed is:

1. A method for assembling a sliding sunroof frame and cover therefor on a motor vehicle roof having an underside sunroof reinforcement frame, comprising:

a) providing a tool that has an upper part and a lower part spaced vertically from one another;

b) providing a lifting frame carried by the lower part of said tool;

c) providing a floating frame carried by the lower part of the tool;

d) positioning said sliding sunroof frame and cover on the lower part of said tool;

e) introducing the lower part of the tool into an opening of a motor vehicle body along with said lifting frame, said floating frame and said sunroof frame and cover and positioning the upper part of the tool above a roof opening provided in the roof of the motor vehicle body;

f) operating the floating frame by using actuators disposed on the tool to properly align the sunroof frame and cover with the roof opening of the vehicle;

g) operating the lifting frame to raise the sliding sunroof frame and press the sliding sunroof frame against the reinforcement frame disposed on the underside of the vehicle roof, h) fastening the sliding sunroof frame to the reinforcement frame, i) engaging and securing the cover with suction devices that are carried by the upper part of the tool, and then moving the suction devices upwards to move the cover upwards, j) moving the suction devices in a first direction so that the cover is pressed against a seal adjacent a front edge of the roof opening, k) moving a sliding sunroof mechanism connected with the cover in a direction opposite the first direction, l) fastening the cover to the sliding sunroof mechanism, m) disengaging the suction devices from the cover and removing the tool from the motor vehicle body.

2. A method in accordance with claim 1, further comprising:

providing a clamping device on the lower part of said tool;

activating said clamping device after step g) to prevent said floating frame from moving said sunroof frame from the proper alignment thereof.

3. A method in accordance with claim 2, further comprising: deactivating the clamping device before step j) and then activating the clamping device after step k).

* * * * *